United States Patent [19]
Nishida

[11] Patent Number: 6,080,797
[45] Date of Patent: Jun. 27, 2000

[54] POROUS MOISTURE-ABSORBING AND DESORBING POLYMER AND A METHOD FOR MANUFACTURING THE SAME

[75] Inventor: Ryosuke Nishida, Okayama-ken, Japan

[73] Assignee: Japan Exlan Company Limited

[21] Appl. No.: 09/322,407

[22] Filed: May 28, 1999

[30] Foreign Application Priority Data

Jul. 1, 1998 [JP] Japan .................................. 10-202693

[51] Int. Cl.⁷ ....................................................... C09J 9/28
[52] U.S. Cl. ............................................. 521/64; 521/142
[58] Field of Search ........................................ 521/64, 142

[56] References Cited

U.S. PATENT DOCUMENTS 5,451,613  9/1995  Smith et al. .

FOREIGN PATENT DOCUMENTS 0156541  4/1985  European Pat. Off. .
5-105704  4/1993  Japan .
8-225610  9/1996  Japan .
2196633  9/1987  United Kingdom .

*Primary Examiner*—Morton Foelak
*Attorney, Agent, or Firm*—Rhodes, Coats & Bennett, LLP

[57] ABSTRACT

There is disclosed a porous moisture-absorbing and desorbing polymer, characterized in that, said polymer is an organic polymer containing 2.0–12.0 meq/g of carboxyl-groups of a salt type, having a cross-linking structure and having macropores of not less than 1 $m^2/g$ of specific surface area and 0.005–1.0 $\mu m$ of average pore size.

2 Claims, No Drawings

POROUS MOISTURE-ABSORBING AND DESORBING POLYMER AND A METHOD FOR MANUFACTURING THE SAME

TECHNICAL FIELD OF THE INVENTION

The present invention relates to a porous moisture-absorbing and desorbing polymer having high moisture-absorbing and desorbing properties and good moisture-absorbing and desorbing rates and also relates to a method for manufacturing the same.

PRIOR ART

As a means for the removal of moisture in air, moisture absorbers such as lithium chloride, calcium chloride, magnesium chloride and phosphorus pentaoxide have been used so far. Those moisture absorbers have much moisture absorbing capacity and high moisture absorbing rate but, due to their deliquescent property, they have disadvantages that they are liquefied after moisture absorption to contaminate others and that they are hardly molded and difficult to reactivate. Besides them, various kinds of moisture absorbers of an inorganic type such as silica gel, zeolite, sodium sulfate, activated alumina and activated carbon have been used as well. When moisture is absorbed with those moisture absorbers of an inorganic type, the shape is stable, no stickiness is resulted and the processing property is good. However, they have practical problems that their saturated moisture-absorbing capacity itself is small and, in some uses, their moisture-absorbing property is insufficient and that, when high moisture-absorbing property is required, they are to be added too much resulting in inconvenience.

Against the above, super water-absorbing resins represented by a polyacrylate type are sometimes used with regard to a moisture-absorber of an organic type. However, in the case of such super water-absorbing resins, their water-absorbing ability is very good but their moisture-absorbing property is not satisfactory. One of the specific problems is that their saturated moisture-absorbing capacity under low humidity is small and another is that their moisture-absorbing rate is slow. In addition, it is pointed out as a disadvantage of them that, once moisture is absorbed, the absorbed water is hardly desorbed.

Those problems are pointed out in the Japanese Laid-Open Patent Publication Hei-05/105,704 for example and, as a countermeasure therefor, a method in which an acrylate and a deliquescent inorganic salt are combined has been proposed. It is mentioned in said method that moisture-absorbing property under low humidity can be improved and an absorber having a high moisture-absorbing capacity without dripping of the liquid can be prepared. With regard to a moisture-absorbing rate however, time required for moisture absorption is in an order of hours (in the examples, a significant increase in a moisture-absorbing amount is available during ten hours) and they are not satisfactory in the use where moisture-absorbing rate in an order of minutes or seconds is required such as a rotary moisture removing device.

Particularly with regard to a moisture-absorbing rate, it is pointed out, as mentioned in *Kogyo Zairyo*, volume 29, no. 8, page 18, that a highly hydrophilic polymer such as a highly water-absorbing resin has a slow moisture-absorbing rate as a whole. The reason therefor is mentioned to be that, due to an interaction among polar groups, molecular movement of the polymer itself is suppressed and diffusion of water hardly takes place. With regard to a high saturated moisture-absorbing capacity under high humidity, it is mentioned that, with a progress of absorption of moisture, said interaction is gradually deteriorated and plasticization proceeds so that diffusion of water is apt to take place whereupon relatively high saturated moisture-absorbing amount is finally achieved.

PROBLEMS TO BE SOLVED BY THE INVENTION

An object of the present invention is to offer, by utilizing a high affinity of organic high-molecular substance having polar groups with water, an organic polymer having good moisture-absorbing and desorbing properties and being able to express said moisture-absorbing and desorbing properties within a short period or, in other words, having a good moisture-absorbing and desorbing rates.

MEANS TO SOLVE THE PROBLEMS

The present inventor has carried out an intensive study for hydrophilic polymers and for the method for manufacturing the same. As a result, it has been found that, when an organic polymer having polar groups and high affinity with water is made into a porous substance having pores of a specific size, it is now possible to give an organic polymer having high moisture-absorbing and desorbing properties and also having good moisture-absorbing and desorbing rates whereby the present invention has been accomplished. Thus, the above-mentioned object of the present invention can be achieved by:

a porous moisture-absorbing and desorbing polymer, characterized in that, said polymer is an organic polymer containing 2.0–12.0 meq/g of carboxyl groups of a salt type, having a cross-linking structure and having macropores of not less than 1 $m^2/g$ of specific surface area and 0.005–1.0 $\mu$m of average pore size; and the following two manufacturing methods, i.e.

(1) a method for the manufacture of a porous moisture-absorbing and desorbing polymer, characterized in that, a polymer solution prepared from an acrylonitrile polymer and a solvent therefor is coagulated in a solvent which is a non-solvent for said polymer to give a porous acrylonitrile polymer, then cross-links are introduced thereinto by the reaction with a hydrazine compound, and a hydrolysis of the residual nitrile group is conducted to introduce 2.0–12.0 meq/g of carboxyl groups of a salt type thereinto whereby the resulting polymer has macropores of not less than 1 $m^2/g$ of specific surface area and 0.005–1.0 $\mu$m of average pore size; and (2) a method for the manufacture of a porous moisture-absorbing and desorbing polymer, characterized in that, a monomer mixture containing not less than 50% by weight of acrylonitrile is subjected to an aqueous precipitation polymerization to give a porous acrylonitrile polymer, then cross-links are introduced by the reaction with a hydrazine compound, and a hydrolysis of the residual nitrile group is conducted to introduce 2.0–12.0 meq/g of carboxyl groups of a salt type therein whereby the resulting polymer has macropores of not less than 1 $m^2/g$ of specific surface area and 0.005–1.0 $\mu$m of average pore size.

The present invention will now be further illustrated as hereunder.

BEST MODE FOR CARRYING OUT THE INVENTION

Firstly, it is necessary that the organic polymer in the present invention contains 2.0–12.0 meq/g of carboxyl groups of a salt type and has a cross-linking structure. Said carboxyl group of a salt type is a highly hydrophilic polar group for resulting in hygroscopicity and it is preferred to contain said group as many as possible in achieving a high moisture-absorbing property. However, in order to make the moisture-absorbing rate higher together with a high moisture-absorbing capacity, they are to be well-balanced in view of the ratio with the cross-linking structure. To be more specific, when the amount of the carboxyl group of a salt type is too much or, in other words, when it is more than 12.0 meq/g, the ratio of the cross-linking structure which can be introduced thereinto becomes too small whereby the porosity of the polymer is unable to be maintained and a sufficient moisture-absorbing rate is unable to be achieved. In an extreme case where only the carboxyl group of a salt type is increased, the product is as if a super water-absorbing resin and, as mentioned already, an extreme reduction in a rate is resulted whereby an object of the present invention cannot be achieved.

On the other hand, in case the amount of a carboxyl group of a salt type is small, the moisture-absorbing property reduces and, particularly when it is lower than 2.0 meq/g, the resulting moisture-absorbing property is inferior to that of the above-mentioned moisture-absorbing inorganic materials whereby that has no practical value. Actually, when the amount of the carboxyl group of a salt type is 6.0 meq/g or more, there are many cases where its superiority in terms of moisture-absorbing ability is significant as compared with other conventional moisture-absorbing materials and a favorable result is obtained.

With regard to the salt which constitutes the carboxyl group of a salt type, there will be no particular limitation so far as it is capable of forming a salt with a carboxyl group and its examples are alkali metal such as Li, Na, K, Rb and Cs, alkali earth metal such as Be, Mg, Ca, Sr and Ba, other metal such as Cu, Zn, Al, Mn, Ag, Fe, Co and Ni, $NH_4$ and organic cation such as amine.

With regard to a method for introducing the carboxyl group of a salt type, there is no particular limitation so far as it has no affection on the formation of macropores having a cross-linking structure and having a specific surface area and an average pore size of not less than 1 $m^2/g$ and 0.005–1.0 $\mu m$, respectively. Examples of such a method are a method where a monomer having a carboxyl group of a salt type is homopolymerized or copolymerized with other copolymerizable monomer to give a polymer, a method where the resulting polymer having carboxyl groups is changed to its salt type, a method where carboxyl groups are introduced by a chemical modification and then, if necessary, the product is changed to a salt type, and a method where the above-mentioned three methods are carried out by means of a graft polymerization.

Examples of a method where a carboxyl group of a salt type is introduced by polymerization of a monomer having a carboxyl group of a salt type are a method in which a homopolymer of a salt type monomer of vinyl and/or vinylidene type containing carboxyl group such as acrylic acid, methacrylic acid, maleic acid, itaconic acid and vinylpropionic acid is prepared, a method in which a copolymer consisting of two or more of them is prepared, and a method in which a copolymer is prepared by a copolymerization with other copolymerizable monomer.

A method where a polymer having a carboxyl group is obtained followed by changing to a salt type is, for example, a method in which a homopolymer of the above-mentioned vinyl and/or vinylidene monomer containing carboxyl groups, a copolymer consisting of two or more of them or a copolymer with other copolymerizable monomer is prepared by polymerization and then it is changed to a salt type. There is no particular limitation for changing a carboxyl group to a salt type and that can be carried out by treating the resulting high-molecular compound is treated with a solution containing much amount of alkali metal ion such as Li, Na, K, Rb and Cs, alkali earth metal ion such as Be, Mg, Ca, Sr and Ba, other metal ion such as Cu, Zn, Al, Mn, Ag, Fe, Co and Ni, $NH_4$ and organic cation such as amine to conduct an ion exchange.

An example of a method where a carboxyl group is introduced by means of a chemical modification is a method in which a polymer consisting of a monomer which is capable of giving a carboxyl group by a chemical modification is prepared, hydrolyzed by means of hydrolysis and, if the product is not a salt type, it is changed to a salt type by the means mentioned already. Examples of a monomer which can be subjected to such a method are monomers having a cyano group such as acrylonitrile and methacrylonitrile; and anhydrides and derivatives of acrylic acid, maleic acid, itaconic acid, vinylpropionic acid, etc. such as esters including methyl (meth)acrylate, ethyl (meth)acrylate, n-propyl (meth)acrylate, isopropyl (meth)acrylate, n-butyl (meth)acrylate, n-octyl (meth)acrylate, 2-ethylhexyl (meth) acrylate and hydroxyethyl (meth)acrylate and amides including (meth)acrylamide, dimethyl (meth)acrylamide, monoethyl (meth)acrylamide and n-and tert-butyl (meth) acrylamide. Examples of other methods for introducing a carboxyl group by a chemical modification are oxidation of alkene, alkyl halide, alcohol, aldehyde, etc.

With regard to other monomers which are copolymerizable with the above-mentioned monomers, there is no particular limitation and their examples are vinyl halide compounds such as vinyl chloride, vinyl bromide and vinyl fluoride; vinylidene monomers such as vinylidene chloride, vinylidene bromide and vinylidene fluoride; unsaturated carboxylic acids such as acrylic acid, methacrylic acid, maleic acid and itaconic acid and salts thereof; acrylates such as methyl acrylate, ethyl acrylate, butyl acrylate, octyl acrylate, methoxyethyl acrylate, phenyl acrylate and cyclohexyl acrylate; methacrylates such as methyl methacrylate, ethyl methacrylate, butyl methacrylate, octyl methacrylate, phenyl methacrylate and cyclohexyl methacrylate; unsaturated ketones such as methyl vinyl ketone, ethyl vinyl ketone, phenyl vinyl ketone, methyl isobutenyl ketone and methyl isopropenyl ketone; vinyl esters such as vinyl formate, vinyl acetate, vinyl propionate, vinyl butyrate, vinyl benzoate, vinyl monochloroacetate, vinyl dichloroacetate, vinyl trichloroacetate, vinyl monofluoroacetate, vinyl difluoroacetate and vinyl trifluoroacetate; vinyl ethers such as methyl vinyl ether and ethyl vinyl ether; acrylamide and alkyl substituted compounds thereof; acid compounds containing a vinyl group and salts, anhydrides and derivatives thereof such as vinylsulfonic acid, allylsulfonic acid, methallylsulfonic acid, styrenesulfonic acid, 2-acrylamido-2-methylpropanesulfonic acid, sulfopropyl methacrylate, vinylstearic acid and vinylsulfinic acid; styrene or alkyl- or halogen-substituted compounds thereof such as styrene, methylstyrene and chlorostyrene; allyl alcohol or esters or ethers thereof; vinylimides such as N-vinylphthalimide and N-vinylsuccinoimide; basic vinyl compounds such as vinylpyridine, vinylimidazole, dimethylaminoethyl methacrylate, N-vinylpyrrolidone, N-vinylcarbazole and vinylpyridine; unsaturated aldehydes such as acrolein and methacrolein; and cross-linking vinyl compounds such as glycidyl methacrylate, N-methylolacrylamide, hydroxyethyl methacrylate, triallyl isocyanurate, triallyl cyanurate, divinylbenzene, ethylene glycol di(meth)acrylate, diethylene glycol di(meth)acrylate, triethylene glycol di(meth) acrylate, trimethylolpropane tri (meth) acrylate and methylene bisacrylamide.

There is no particular limitation for the cross-linking structure of the present invention so far as it is capable of having macropores having not less than 1 m²/g of specific surface area and 0.005–1.0 μm of average pore size and is not modified either physically or chemically as a result of absorption and desorption of moisture and any of the structures of cross-link, ionic cross-link and cross-link by intermolecular interaction of polymer or by crystal structure will do. In addition, there is no particular limitation for a method of introduction of cross-link and commonly used methods such as a cross-linking by a cross-linking monomer in a polymerizing stage of the main chain, an after-cross-linking after polymerization, and introduction of a cross-linking structure by means of physical energy may be used.

Among them, a method where a cross-linking monomer is used in a polymerizing stage of the main chain and a method by an after-cross-linking after obtaining a polymer are particularly preferred in view of maintaining a porosity since they are able to introduce a strong cross-link by a covalent bond.

In a method where a cross-linking monomer is used, it is possible to manufacture an organic high-molecular substance due to a covalent bond where the already-mentioned cross-linking vinyl compound is used and is copolymerized with a monomer having a carboxyl group or being able to be modified to a carboxyl group. However, in that case, the cross-linking monomer should be that which is not affected by an acidic condition of acrylic acid or the like or by a chemical influence (such as hydrolysis) upon conducting a modification to a carboxylic acid in the introduction of an acrylic acid group and the cross-linking monomer is limited to that which is able to be applicable therefor.

Examples of the cross-link which can be introduced by such methods are that which is introduced by a cross-linking vinyl compound such as glycidyl methacrylate, N-methylolacrylamide, hydroxyethyl methacrylate, diethylene glycol di(meth) acrylate, triethylene glycol di(meth) acrylate, trimethylolpropane tri(meth)acrylate and methylene bisacrylamide. Among them, cross-linking structure by triallyl isocyanurate, triallyl cyanurate, divinylbenzene, ethylene glycol di(meth)acrylate and methylene bisacrylamide is particularly appropriate for achieving a strong porous substance.

There is no particular limitation in a method by means of an after-cross-linking as well and an example is a method by an after-cross-linking consisting of a structure obtained by a reaction of a nitrile group contained in a nitrile polymer consisting of not less than 50% by weight of vinyl monomer having a nitrile group with a hydrazine compound or with formaldehyde. Among the above-mentioned ones, a method using a hydrazine compound is particularly excellent since it contributes to an improvement in a moisture-absorbing property because of its stability to acid and alkali and of hydrophilicity of the cross-linking structure itself and further since it is able to introduce a strong cross-link which can maintain the shape of the porous substance, etc. Although the details are not identified, the cross-linking structure obtained by said reaction is presumed to be due to a triazole ring or a tetrazole ring structure.

There is no particular limitation for the vinyl monomer having a nitrile group used therefor so far as it has a nitrile group and its specific examples are acrylonitrile, methacrylonitrile, ethacrylonitrile, α-chloroacrylonitrile, α-fluoroacrylonitrile and vinylidene cyanide. Among them, acrylonitrile which is advantageous in terms of cost and contains many nitrile group numbers per unit weight is most preferred.

Examples of the hydrazine compound are hydrazine salts such as hydrazine hydrate, hydrazine sulfate, hydrazine hydrochloride, hydrazine nitrate, hydrazine bromate and hydrazine carbonate and hydrazine derivatives such as ethylenediamine, guanidine sulfate, guanidine hydrochloride, guanidine nitrate, guanidine phosphate and melamine.

There is no particular limitation for the organic high-molecular substance in the present invention and that corresponds to the above-mentioned vinyl polymers, etc. There is no particular limitation for the polymer used as a stem in conducting a graft polymerization so far as it has a cross-linking structure and is able to have macropores having a specific surface area of not less than 1 m²/g and an average pore size of 0.005–1.0 μm and any of natural polymer, semi-synthetic polymer and synthetic polymer may be used. Specific examples of the polymer are polymers of a plastic type such as polyethylene, polypropylene, vinyl chloride, ABS resin, Nylon, polyester, poly(vinylidene chloride), polyamide, polystyrene, polyacetal, polycarbonate, acrylic resin, fluororesin, polyurethane elastomer, polyester elastomer, melamine resin, urea resin, ethylene tetrafluoride resin, unsaturated polyester resin, epoxy resin, urethane resin and phenol resin; common fiber-formable polymers such as Nylon, polyethylene, rayon, acetate polymer, acrylic polymer, poly(vinyl alcohol), polypropylene, cupra, triacetate and vinylidene; natural rubber; and polymers of a synthetic rubber type such as silicone rubber, SBR (styrene butadiene rubber), CR (chloroprene rubber), EPM (ethylene propylene rubber), FPM (fluorine rubber), NBR (nitrile rubber), CSM (chlorosulfonated polyethylene rubber), BR (butadiene rubber), IR (synthetic natural rubber), IIR (butyl rubber), urethane rubber and acrylic rubber.

It is necessary that the porous moisture-absorbing and desorbing polymer of the present invention has macropores having not less than 1 m²/g of specific surface area and 0.005–1.0 μm of average pore size. Here, the term "specific surface area" means a value measured by a one-point means in a BET method which is a physical adsorption method. The term "average pore size" means a value calculated by a formula 4 V/S where S is a specific surface area and V is a pore volume per unit mass obtained from a pore size distribution measured by a mercury compression method.

Main object of the conventional moisture-absorbing materials of a high-molecular type is to increase a saturated moisture-absorbing capacity and, therefore, attention was paid only to increase the numbers of the hydrophilic group which contributes to the moisture-absorbing capacity. On the contrary, an investigation has been conducted in the present invention paying special attention to the moisture-absorbing rate which has not been paid much particular attention hitherto. It is noteworthy that, in the present invention, the disadvantage that "moisture-absorbing materials of a high-molecular type are slow in terms of moisture-absorbing rate" as pointed out in the already-mentioned literatures can be solved.

The reason why such a problem can be solved is that the porosity of a high-molecular substance has been found to greatly contribute to a moisture-absorbing rate as same as or rather than the contribution of the hydrophilic group. As a result of the present investigation, it has been found that, for obtaining a good moisture-absorbing rate, such conditions that the product should be a porous substance having hydrophilic polar groups under the already-mentioned conditions and having many pores which are not affected by absorption and desorption of moisture and are fixed by a strong cross-linking structure and further that an average pore size of said pores is within a predetermined range are to be satisfied.

Thus, with regard to the porosity which is essential in the porous moisture-absorbing and desorbing polymer of the present invention capable of giving good moisture-absorbing and desorbing rates, it is necessary to be 1 $m^2/g$ or more in terms of a specific surface area. Even when there are sufficient amount of carboxyl groups of a salt type, the interaction between the hydrophilic polar groups becomes too high and a porous structure which can be counted as a specific surface area is not formed if the specific surface area is less than 1 $m^2/g$. Therefore, although the saturated moisture-absorbing capacity may be sometimes sufficient, the moisture-absorbing rate becomes very slow due to a decrease in mobility of water molecules whereby an object of the present invention cannot be achieved.

There is a tendency that the more the specific surface area, the quicker the moisture-absorbing rate but it is not always true that, when the specific surface area is made larger, a product having good moisture-absorbing rate is prepared. Thus, even when the specific surface area is large, there are some cases in which the pores themselves inhibit the diffusion of water molecules and, as a result, a reduction in a moisture-absorbing rate is resulted if the average pore size is very small. Accordingly, in view of the moisture-absorbing rate, a good balance between the above-mentioned specific surface area and average pore size is important. In such a sense, it is necessary in the present invention that the product has the above specific surface area and also has macropores having an average pore size of 0.005–1.0 $\mu$m.

When the average pore size is less than 0.005 $\mu$m, the pores are too small and, therefore, the space where the water molecules are diffused is reduced and a moisture-absorbing rate decreases. Finally, a Knudsen diffusion area is resulted and a diffusing rate of water molecules is significantly reduced whereby a satisfactory moisture-absorbing rate is not available. On the other hand, when it is more than 1.0 $\mu$m, pores of the high-molecular substance itself become too large whereby there are problems that the product consists of spaces only, specific gravity as a moisture-absorbing material becomes small, moisture-absorbing capacity per unit volume is reduced and no practical value is available.

A first method for the manufacture of the porous moisture-absorbing and desorbing polymer of the present invention is a method for the manufacture of a porous moisture-absorbing and desorbing polymer, characterized in that, a polymer solution prepared from an acrylonitrile polymer and a solvent therefor is coagulated in a solvent which is non-solvent for said polymer to give a porous acrylonitrile polymer, then cross-links are introduced by the reaction with a hydrazine compound, and a hydrolysis of the residual nitrile group is conducted to introduce 2.0–12.0 meq/g of carboxyl groups of a salt type thereinto whereby the resulting polymer has macropores of not less than 1 $m^2/g$ of specific surface area and 0.005–1.0 $\mu$m of average pore size.

There is no particular limitation for preparing a porous polymer of an acrylonitrile type by means of the above-mentioned coagulating method but any method may be used although a method for the manufacture of said polymer has been fully investigated in the method for the manufacture of acrylic fibers and such a method may be appropriately used. Its examples are Japanese Examined Patent Publications Sho-60/11124 and Sho-61/42005 and Japanese Laid-Open Patent Publications Sho-47/25416, Sho-47/25418, Sho-63/309613, Sho-50/5649, Sho-52/12153 and Hei-07/150470. It is necessary that the fibrous physical property of acrylic fiber for common clothing is to be sufficient for an operating ability for the after-processing steps such as spinning, knitting, weaving and dyeing and also for maintenance of quality. For such a purpose, such a fiber is in a rigid high-molecular structure by optimizing the spinning, coagulating, elongating and heating conditions and is not in a porous structure. On the contrary, in some of the patents listed above, there are examples where porous structure is prepared by rising the temperature of a coagulating bath or by optimizing the coagulating bath such as by means of a slow coagulation and such methods may be used in the present invention as well.

In the above examples, fiber is obtained but, in case a product which is in other shapes than fiber is obtained, a method corresponding to that where aimed shape is applied instead of nozzles for spinning is conducted under the conditions as mentioned in the above patent to give said porous polymer. For example, in the case of preparation of particles and granules, a polymer solution is dripped from a mesh to give liquid droplets followed by coagulating while, in the case of preparation of film, a polymer solution is applied on glass plate, paper, nonwoven fabric, cloth, etc. followed by coagulating whereupon the desired porous polymer can be obtained.

There is no particular limitation in a method where a cross-link is introduced by the reaction with a hydrazine compound so far as the desired cross-linking structure is obtained and concentrations of acrylonitrile porous polymer and hydrazine compound upon the reaction, solvent used, reaction time, reaction temperature, etc. may be appropriately selected according to the necessity. With regard to the reaction temperature among them, there may occur some problems such as that reaction rate becomes slow and reaction time becomes too long when the temperature is too low while, when it is too high, plasticization of the starting acrylonitrile polymer takes place and porosity is deteriorated. Accordingly, the preferred reaction temperature is 50–150° C. or, more preferably, 80–120° C. There is no particular limitation for the site of the acrylonitrile porous polymer which is to be made to react with a hydrazine compound as well and that may be appropriately selected depending upon the use and the shape of said polymer. To be more specific, the reaction only on the surface of said polymer, the reaction even into the core as a whole, the reaction at specific sites, etc. may be appropriately selected. Examples of the hydrazine compound used here are hydrazine salts such as hydrazine hydrate, hydrazine sulfate, hydrazine hydrochloride, hydrazine nitrate, hydrazine bromate and hydrazine carbonate and hydrazine derivatives such as ethylenediamine, guanidine sulfate, guanidine hydrochloride, guanidine nitrate, guanidine phosphate and melamine.

There is no particular limitation for a method of introducing the carboxyl group of a salt type by means of a hydrolyzing reaction to an extent of 2.0–12.0 meq/g as well and known hydrolyzing conditions may be applied. For example, the above-mentioned cross-linked porous polymer and an aqueous solution of a base such as alkali metal hydroxide or ammonia, a mineral acid such as nitric acid, sulfuric acid or hydrochloric acid, or an organic acid such as formic acid or acetic acid are added followed by heating. With regard to a condition of the present invention to make the amount of carboxyl group of a salt type 2.0–12.0meq/g, that may be decided by making the relation between the reaction factors such as reaction temperature, concentration, time, etc. and also by making the amount of the salt type carboxyl group to be introduced clear by means of experiments. Incidentally, a hydrolyzing reaction may be carried out together with the above-mentioned introduction of the cross-link. Here, when hydrolysis is carried out using an acid, it is necessary to convert the carboxyl group to a salt type one.

The second method for the manufacture of the porous moisture-absorbing and desorbing polymer of the present invention is a method for the manufacture of a porous moisture-absorbing and desorbing polymer, characterized in that, a monomer mixture containing not less than 50% by weight of acrylonitrile is subjected to an aqueous precipitation polymerization to give a porous acrylonitrile polymer, then cross-links are introduced by the reaction with a hydrazine compound, and a hydrolysis of the residual nitrile group is conducted to introduce 2.0–12.0 meq/g of carboxyl groups of a salt type therein whereby the resulting polymer has macropores of not less than 1 $m^2/g$ of specific surface area and 0.005–1.0 µm of average pore size.

In the present invention, it is necessary to contain not less than 50% by weight of acrylonitrile as a monomer with an object of introducing a cross-linking site for introduction of a strong cross-link for maintaining the porosity and of introducing a hydrophilic polar group. When the amount of acrylonitrile is less than 50% by weight, the cross-link becomes weak and a desired porous material cannot be obtained. In addition, the moisture-absorbing capacity becomes small and an object of the present invention cannot be achieved. With regard to the residue of the monomers, there is no particular limitation so far as it is a copolymerizable monomer and the already-mentioned copolymerizable monomers may be used. Among them however, acrylic acid, maleic acid, acrylates, etc. which can be efficiently introduce a carboxyl group thereinto are particularly preferred.

An aqueous precipitation polymerization in the present invention means that a water-soluble initiator is used, that none of emulsifier, dispersion stabilizer, etc. is added and that, as the polymerization proceeds, the polymer is coagulated and precipitated (suspended during stirring). In the case of polymerization of an acrylonitrile type, precipitation of porous coagulate wherein primary particles having an average particle size of not more than 10 µm are coagulated takes place when this aqueous precipitation polymerization is applied. There are many cases where the particle size of said coagulate is not larger than 1,000 µm. Although there is no particular limitation for said coagulate, it is particularly preferred in the present invention when the coagulate is composed of the particles where the average particle size of primary particles is not more than 5 µm and an average particle size of said coagulates is not more than 100 µm because many cavities are formed in the gaps among the primary particles and a specific surface area of the coagulate becomes large.

With regard to the reaction with a hydrazine compound for introduction of a cross-link and to the introduction of a carboxyl group of a salt type by a hydrolyzing reaction of the residual nitrile group in the present method, they are as same as those in the above-mentioned first method.

There is no particular limitation for the shape of the porous moisture-absorbing and desorbing polymer and appropriate ones such as particles, fiber and sheet may be selected. Among them, particles are particularly useful because they can be used for various uses as additives in various usage forms and their applicable range is broad. Size of such particles may be appropriately selected depending upon the use and, although there is no particular limitation therefor, their applicable range as various additives becomes broader resulting in a big practical value in case of particles having an average particle size of not more than 1, 000 µm or particularly in case of fine particles having an average particle size of not more than 100 µm.

In the case of fiber, various processings to paper, nonwoven fabric, woven product, knitted product, molded fiber, etc. can be easily conducted and, therefore, its applicable use is expanded and that is useful. In the case of sheet, it can be directly subjected to a process into corrugating or the like and is useful for the use such as filter. In the case of this sheet, it covers not only the porous moisture-absorbing and desorbing polymer per se but also a sheet carried on nonwoven fabric, woven thing, knitted thing, etc.

Especially when the polymer obtained by the present invention is used as paper, nonwoven fabric, woven product, knitted product, foamed sheet, etc. among the above usage forms, that is useful as a material as a moisture-absorbing material since the contacting area with gas is large and, in addition, the ability of holding its shape is good. There is no particular limitation for the method of constituting the above so far as the porous moisture-absorbing and desorbing polymer of the present invention is used and, to be more specific, any of a method where the shape is constituted by said polymer in a fibrous shape, a method where said polymer in a shape of particles is carried, etc. may be used. However, in view of a simple processing and of a low cost, better result is achieved when porous moisture-absorbing and desorbing polymer in a shape of particles is carried thereon.

There is no particular limitation for a method of carrying but various methods may be used such as, for example, the polymer is mixed or impregnated with a matrix constituting the crude a material or is applied or incorporated using a binder. The porous moisture-absorbing and desorbing polymer particles may be present in or on said matrix and, for example, any of the methods such as a method where said polymer particles are mixed during the manufacturing course of paper, nonwoven fabric, woven thing, knitted thing, foamed sheet, etc., a method where slurry of said polymer particles are mixed therewith or applied thereon using a binder, etc. many be used.

To be more specific, in the case of manufacture of paper by means of an art of using porous moisture-absorbing and desorbing polymer particles as fillers, said polymer particles and other additives are added to a dispersion of pulp in a large amount of water or to a slurry of paper manufacturing materials such as synthetic fiber and the mixture is well mixed and subjected to a conventional paper manufacturing machine whereby the paper can be manufactured. In that case, a fixing agent may be added for suppressing the flowing-out of the fillers if necessary. Examples of the fixing agent are modified polyethyleneimine, modified polyacrylamide, sodium alginate, acacia, soluble starch, aluminum sulfate and potassium alum. Amount of the fixer used may be appropriately selected depending upon its type and also upon the amount of said polymer particles used. In this paper manufacturing step, commonly used sizing agents, dyes, paper force potentiators, etc. may be used appropriately. With regard to a surface-active agent, anionic, cationic or nonionic one may be suitably selected and used by taking other additives into consideration. Although there is no particular limitation for the porous moisture-absorbing and desorbing polymer particles used for such a paper manufacture, the use of powder having a particle size of 1–100 μm gives a favorable result. When the particle size is smaller than 1 μm, the particles fall down during the paper manufacturing stage together with water from a net for the paper manufacturing machine while, when it is larger than 100 μm, there may be a problem that it is too big to be uniformly dispersed.

In the case of forming a nonwoven fabric, there is no particular limitation but the present invention is applicable to nonwoven fabric made by various kinds of manufacturing methods. Specific examples in the case of a dry method are an impregnating method of an adhesive type, a printing method, a spraying method, a powdering method, an adhesive fiber method (thermal bond method), a felt method of a mechanical bonding type, a stitching method, a needle punching method, a spun lace method of a flow slip type, a spun bond method of a spinning type, a net method, a melt flow method and a film method while those in the case of a wet method are a spun lace method of a flow slip type, a spun bond method of a spinning type, a flush spinning method, a thermal fusion fiber method of a paper manufacturing type, a thermal compression method and an adhesive method. There is no particular limitation for a method for carrying the porous moisture-absorbing and desorbing polymer and, for example, various methods such as a method where the polymer is sandwiched between those nonwoven fabrics, a method where the polymer is adhered with and carried on the fibrous material constituting the nonwoven fabric, and a method where the polymer is applied on the surface of the nonwoven fabric may be used for carrying. Although there is no particular limitation for the mass per unit area for such a nonwoven fabric, the case where it is 20–300 g/m² often gives good result. When it is less than 20 g/m², strength is low and the product is apt to be broken while, when it is more than 300 g/m², passing ability of gas and liquid tends to become low and that will not be favorable in some cases. Examples of the particularly preferred nonwoven fabric are a spun bond nonwoven fabric which is formed by the use of compounded fiber composed of a sheath component consisting of polyethylene and a core component consisting of polypropylene or polyester, a nonwoven fabric of a two-layered structure where the surface is a polyester fiber web layer while the back is a polypropylene web layer, etc. Since those nonwoven fabrics can be easily processed due to their low-melting polyolefin components, they are able to give favorable materials. When plastic foams are used as a matrix, said polymer particles are mixed with the plastic foams such as a foamed polyurethane or a slurry of porous moisture-absorbing and desorbing polymer particles is impregnated therewith by a conventional method whereby desired foamed plastic containing said polymer can be prepared.

The reason why the porous moisture-absorbing and desorbing polymer in accordance with the present invention has high moisture-absorbing and desorbing properties and good moisture-absorbing and desorbing rates is presumed to be that said polymer has many polar groups having high hydrophilicity, that is has a big specific surface area, and particularly that it has macropores where diffusion of water molecules related to absorption and desorption of moisture can be smoothly carried out. It is further presumed that, as a result of introduction of hydrophilic cross-link obtained by the reaction of a hydrazine compound with a nitrile group, expression of higher moisture-absorbing ability is now possible.

EXAMPLES

The present invention will now be further illustrated by way of the following examples although the present invention is not limited to such examples only. Incidentally, the terms parts and percentage in the examples are those by weight unless otherwise mentioned. Firstly, an evaluating method for each of the characteristics and the way of describing the evaluated result will be explained.

Moisture-absorbing property was evaluated in terms of the saturated moisture-absorbing ratio and an moisture-absorbing ratio for ten minutes and for one hour. With regard to a moisture-absorbing rate, it is likely that the higher the moisture-absorbing ratio between the above ten minutes and one hour, the quicker the moisture-absorbing rate. The moisture-absorbing ratio used here means that which is obtained by the following method. Thus, about 1.0 g of the sample was dried in a hot air drier at 105° C. for 16 hours and its weight was weighed (W1 in grams). Then the sample was placed in a device where temperature and humidity were kept constant (20° C. temperature and 65% relative humidity [RH] for a certain period (24 hours in the case of a saturated moisture-absorbing ratio; one hour in the case of a one-hour moisture-absorbing ratio; and ten minutes in the case of a ten-minute moisture-absorbing ratio) and the weight of the moisturized sample was weighed (W2 in grams). Calculation was conducted by the following formula from the above results.

Moisture-absorbing ratio (% by weight)={(W2 −W1)/W1}×300

The moisture-desorbing property was evaluated in terms of a moisture-desorbing ratio. This is a value defined to be as follows. Thus, the difference between the weight of the sample which was subjected to a saturated moisturization under the condition of 20° C./80% RH and the weight of said moisturized sample after being allowed to stand for one hour under the condition of 20° C./40% RH is divided by the weight of the starting dry sample (defined as W1 hereinabove) followed by being multiplied by 100. Incidentally, when the sample to be measured was in particles or in fiber, attention was paid to make it in a single layer for preventing the piling of the sample so as to prevent the error in measurement of the moisture-absorbing rate.

With regard to an average particle size of the coagulates, a particle size distribution measuring device of a laser diffraction type manufactured by Shimadzu (SALD 2000) was used, the result measured by the use of water as a dispersing medium was expressed on the basis of volume and the resulting median diameter was defined as an average particle size. With regard to a primary particle size of the coagulates, particle sizes of 100 primary particles were measured by means of electron microscopic pictures and a mean value was calculated therefrom.

With regard to a carboxyl group amount, the polymer to be tested was dispersed in water, pH was adjusted to 2.0 by 1N hydrochloric acid, a titration was conducted by a 0.1 N aqueous solution of NaOH and the amount was calculated from the resulting titration curve.

Example 1.

Water (1,081 parts) was placed in a two-liter polymerization reactor and heated up to 60° C. and 6.2 parts of sodium pyrosulfite were added as a reducing agent. Then, each of a solution of a mixture of monomers (450 parts of acrylonitrile and 50 parts of methyl acrylate) and an aqueous solution where 5 parts of ammonium persulfate were dissolved in 100 parts of water was dropped thereinto during two hours to conduct a polymerization and, after that, the mixture was heated up to 80° C. to conduct an after-polymerization for two hours. After completion of the polymerization, it was cooled down to room temperature with a continued stirring to give a dispersion of porous polymer which was a coagulate having an average particle size of 42 μm. When the primary particles of this coagulate was observed under an electron microscope, the average particle size was 0.3 μm.

Then 100 parts of the resulting polymer were mixed with 50 parts of hydrazine (60% by weight) and 850 parts of water, the mixture was subjected to a hydrazine treatment under the condition of 90° C. for three hours to introduce a cross-link, then 100 parts of sodium hydroxide were added and the mixture was made to react at 120° C. for five hours so that the residual nitrile group was hydrolyzed to convert to a carboxylic acid group (sodium type at the stage of completion of the hydrolysis) whereupon the porous moisture-absorbing and desorbing polymer of the present invention was prepared. An average particle size of the resulting porous moisture-absorbing and desorbing polymer in a coagulated form was 51 μm while an average particle size of its primary particles was 0.4 μm. Amount of the carboxyl group was 7.2 meq/g and specific surface area and average pore size were 4.3 $m^2$/g and 0.4 μm, respectively showing sufficient carboxyl group amount and porosity. With regard to the moisture-absorbing characteristics of the resulting porous moisture-absorbing and desorbing polymer, the results of the evaluation are summarized in Table 1.

When the moisture-absorbing and desorbing characteristics of the resulting porous moisture-absorbing and desorbing polymer were evaluated, ten-minute moisture-absorbing ratio, one-hour moisture-absorbing ratio and saturated moisture-absorbing ratio were 19% by weight, 53% by weight and 55% by weight, respectively and, as compared with the data for silica gel and zeolite which will be mentioned under the comparative examples, the saturated moisture-absorbing ratio was far better and, even in terms of time, the water-absorbing ratio at any time was better as well. Further, as compared with the super high water-absorbing resin of a sodium polyacrylate type (Comparative Example 1), the ten-minute moisture-absorbing ratio of said super high water-absorbing resin was only 2% by weight while, in the case of the porous moisture-absorbing and desorbing polymer of the present invention, it was 19% by weight whereby it was confirmed that a very good moisture-absorbing property was achieved within such a short time. In the comparison on an one-hour moisture-absorbing ratio, it was only 5% by weight in the case of the super high water-absorbing resin whereby only 11.6% of the saturated moisture-absorbing ratio (43% by weight) was expressed while, in the case of the product of the present invention, the one-hour moisture-absorbing ratio was 53% whereby as high as 96.4% of the saturated moisture-absorbing ratio (55%) was expressed. Thus, it was understood that the product of the present invention was able to conduct a significant improvement in a moisture-absorbing ratio which has been a disadvantage in the conventional super high water-absorbing resins of a sodium polyacrylate type. Further, with regard to the moisture desorbing rate, the moisture-desorbing ratio of the super high water-absorbing resin (Comparative Example 1) was only 12% by weight while, in the product of the present invention, it was as high as 45% by weight whereby it was confirmed that the present invention was better in terms of the moisture desorbing rate as well.

Example 2.

The porous moisture-absorbing and desorbing polymer obtained in Example 1 was dispersed in water and the pH was adjusted to 1 using 1N hydrochloric acid. Then 1N KOH was used to adjust to pH 13.5 to give a porous moisture-absorbing and desorbing polymer containing a carboxyl group of a potassium salt type. Moisture absorbing

TABLE 1

|  | Example 1 | Example 2 | Example 3 | Example 4 |
|---|---|---|---|---|
| Type of Moisture-Absorbing and Desorbing Material Used | Product of Invention | Product of Invention | Product of Invention | Product of Invention |
| Carboxyl Group Amount (meg/g) | 7.2 | 7.2 | 8.2 | 7.9 |
| Salt Type Carboxyl Group | Na | K | Na | Na |
| Specific Surface Area ($m^2$/g) | 4.3 | 4.1 | 12.6 | 19.5 |
| Average Pore Size (μm) | 0.4 | 0.4 | 0.07 | 0.065 |
| Shape or Form | Coagulated Particles | Coagulated Particles | Filmy | Fibrous |
| Cross-Linking Structure | Derived from Hydrazine Compound | Derived from Hydrazine Compound | Derived from Hydrazine Compound | Derived from Hydrazine Compound |
| 10-min Moisture-Absorption (wt %) | 19 | 21 | 25 | 23 |
| 1-hr Moisture-Absorption (wt %) | 53 | 52 | 59 | 55 |
| Saturated Moisture-Absorption (wt %) | 55 | 57 | 63 | 60 |
| Moisture-Desorbing Ratio (wt %) | 45 | 47 | 47 | 50 |
| Primary Particle Size (μm) | 0.4 | 0.4 | — | — |
| Particle Size of Coagulates (μm) | 51 | 51 | — | — | characteristics, etc. of said polymer are summarized in Table 1. It was confirmed that, like in the case of Example 1, both saturated moisture-absorbing ratio and moisture-absorbing and desorbing rates were good. In the case of this potassium type, the apparent specific gravity became big and the moisture-absorbing capacity per unit volume was large as compared with that of the product of Example 1.

Example 3.

A polymer (10 parts) of an acrylonitrile type consisting of 90% by weight of acrylonitrile and 10% by weight of methyl acrylate was dissolved in 90 parts of a 48% aqueous solution of sodium thiocyanate and the resulting polymer solution was applied on a nonwoven polypropylene fabric in a thickness of about 50 μm and dipped in water (which was a non-solvent therefor) of 20° C. to conduct a filmy coagulation. The resulting film was well washed with water and subjected to a hydrazine treatment and further to a hydrolysis by the same manner as in Example 1 to give a porous moisture-absorbing and desorbing polymer of the present invention in a filmy shape having a thickness of about 45 μm. Characteristics, etc. of the resulting polymer are summarized in Table 1. As same as in the above examples, it was confirmed that said film had good saturated moisture absorbing ratio and moisture-absorbing and desorbing rates.

Example 4.

The same operations as in Example 3 were carried out except that the polymer solution was spun out from a spinning nozzle having a pore diameter of 60 μm for forming prepared. Probably due to a swelling after the hydrolyzing treatment, an average particle size of said polymer particles was a bit larger to an extent of 64 μm. Characteristics of the resulting polymer are summarized in Table 2. Its moisture-absorbing and desorbing rates were quicker than the conventional super high water-absorbing resins although they were not so good as those of the products in the preceding examples. In addition, the particles themselves were soft which suggested a possibility that the pores were not strongly fixed.

TABLE 2

|  | Example 5 | Comparative Example 1 | Comparative Example 2 | Comparative Example 3 |
|---|---|---|---|---|
| Type of Moisture-Absorbing and Desorbing Material Used | Product of Invention | Sumica gel* | Silica Gel | Zeolite |
| Carboxyl Group Amount (meg/g) | 4.5 | 13.0 | — | — |
| Salt Type Carboxyl Group | Na | Na | — | — |
| Specific Surface Area (m²/g) | 8.3 | ** | 254 | 417 |
| Average Pore Size (μm) | 0.08 | ** | 0.02 | 0.005 |
| Shape or Form | Particles | Particles | Particles | Particles |
| Cross-Linking Structure | Derived from Divinylbenzene | Ambiguous | — | — |
| 10-min Moisture-Absorption (wt %) | 9 | 2 | 14 | 17 |
| 1-hr Moisture-Absorption (wt %) | 15 | 5 | 15 | 17 |
| Saturated Moisture-Absorption (wt %) | 25 | 43 | 15 | 17 |
| Moisture-Desorbing Ratio (wt %) | 18 | 12 | 12 | 16 |
| Primary Particle Size (μm) | 64 |  |  |  |
| Particle Size of Coagulates (μm) | — |  |  |  |

*super high water-absorbing resin
**: measurement impossible a fibrous porous polymer of an acrylonitrile type whereupon a porous moisture-absorbing and desorbing polymer of the present invention in a fibrous form having a fiber diameter of about 48 μm was prepared. Physical properties, etc. of the resulting polymer are summarized in Table 1. As same as in the above examples, it was confirmed that said film had good saturated moisture absorbing ratio and moisture-absorbing and desorbing rates too. In addition, strength and elongating ratio of said fiber were 0.8 g/d and 15%, respectively and said fiber had a physical property which was at least durable for paper manufacture or for carding.

Example 5.

A water-soluble polymer (300 parts) consisting of methacrylic acid and sodium p-styrenesulfonate (in a ratio of 70/30) and 30 parts of sodium sulfate were dissolved in 6,595 parts of water and charged in a polymerization reactor equipped with a stirrer of an oar type. Then, 15 parts of 2,2'-azobis(2,4-dimethylvaleronitrile) were dissolved in a mixture of 2,700 parts of methyl acrylate, 300 parts of divinylbenzene and 1,500 parts of ethyl acetate, charged in a polymerization reactor and subjected to a suspension polymerization for two hours at 60° C. under a stirring condition of 400 rpm to give a porous copolymer of methyl acrylate with divinylbenzene in which an average particle size of the primary particles was 60 μm. Said polymer (100 parts) was dispersed in 900 parts of water, 100 parts of sodium hydroxide were added thereto, and the mixture was subjected to a reaction at 90° C. for two hours to hydrolyze the methyl ester moiety of the methyl acrylate whereupon a porous moisture-absorbing and desorbing polymer of the present invention having 4.5 meq/g of a carboxyl group was Comparative Example 1.

Commercially available Sumica gel (made by SUMITOMO CHEMICAL CO., LTD.) powder which was a super water-absorbing resin of a polyacrylic acid type was used as a moisture-absorbing material and its moisture-absorbing characteristics were evaluated. The result is summarized in Table 2. Although said material had as high as 13 meq/g of carboxyl group amount and the saturated moisture-absorbing ratio was as good as 43%, the moisture-absorbing ratios after ten minutes and after one hour were as low as 2% and 5%, respectively and, as pointed out already, the product had a problem in its moisture-absorbing rate. Another problem was that, after saturation of the moisture absorption, some sticky feel was noted. In addition, the moisture-desorbing rate was as low as 12% by weight as compared with the products of the present invention.

Comparative Example 2.

Silica gel which is a representative moisture absorber of an inorganic type was used and its moisture-absorbing characteristics were evaluated. The result is summarized in Table 2. Even when moisturized, said material did not show a stickiness and, in terms of a ten-minute moisture-absorbing ratio, 14% which was nearly the same as the saturated moisture absorbing ratio was expressed and the moisture-absorbing rate was quick. However, the saturated moisture absorbing ratio itself was 15% which was considerably lower than that of the product in a carboxylate type of the present invention and, as a result thereof, the moisture-absorbing ratio is inferior in any of ten-minute, one-hour and saturated ones. With regard to the moisture desorbing property, it was relatively good in view of the rate although there was the similar tendency that its absolute value is insufficient.

Comparative Example 3.

Same evaluation was conducted for zeolite which was often used as a moisture absorber of an inorganic type as well but, as shown in Table 2, the result was similar to that in the case of Comparative Example 2. The reason why the products of Comparative Examples 2 and 3 were inferior to those of the present invention is presumed to be due to a difference in the hydrophilic groups and due to the fact that the carboxylate group of the present invention showed the highest adsorption of water molecules per unit equivalent.

Comparative Example 4.

The same operations as in Example 3 were carried out except that a 15% aqueous solution of sodium thiocyanate of 0° C. was used as a non-solvent and the polymer was dipped thereinto whereupon a filmy moisture-absorbing material was prepared. Characteristics of the resulting material are summarized in Table 3. As compared with Example 3, the amount of carboxyl group was sufficient and the saturated moisture-absorbing ratio was good. However, since a specific surface area and an average pore diameter were too small whereby the moisture-absorbing ratio within a short period was low and, as a result, like in the case of the conventional sodium polyacrylate type, the moisture absorbing rate was very slow. With regard to a moisture desorbing rate, it was slow too as compared with that of the present invention product. It is likely that the reason therefor is the difference in the coagulating condition between Example 3 and Comparative Example 4. Thus, in the case of Example 3, the coagulating temperature was high and the coagulating bath was a very poor solvent (water) whereby the solvent was quickly removed upon coagulation and a porous structure was highly developed while, in the case of Comparative Example 4, it is likely that the coagulating temperature was low and the coagulating bath itself was an aqueous solution of sodium thiocyanate having a low degree of poor solvent whereby only a slow coagulation took place resulting in a rigid structure.

in Comparative Example 4, the resulting material had a sufficient amount of carboxyl group and showed higher saturated moisture-absorbing ratio than inorganic ones such as silica gel. However, the specific surface area was too small and the average pore size was too large and, therefore, the moisture-absorbing ratio within a short period was low and rather inferior to the inorganic moisture absorbers. As a result, like in the case of the conventional materials of a sodium polyacrylate type, there is a problem in terms of moisture absorbing rate. Further, there was a similar tendency in moisture desorbing rate as well and the material was insufficient in terms of the rate. In order to express the physical property for fiber etc., acrylic fibers for clothing are prepared in such a manner that coagulating, elongating and heating conditions are optimized to give a rigid structure as shown in Comparative Example 4. Thus, it is likely that, a porous structure was not achieved due to the above reason whereby the above outcome was resulted. In addition, the abnormally large average pore diameter was presumably due to the fact that the wrinkles on the surface of the fiber which were the characteristic feature of the acrylic fiber were counted as big pores.

Comparative Example 6.

The same operations as in Example 5 were carried out except that 2,300 parts of methyl methacrylate and 400 parts of methacrylic acid were used instead of 2,700 parts of methyl acrylate to give a moisture absorbing material in a form of particles. Since the resulting particles were in an carboxylic acid type, the pH was adjusted to 12 using 0.1N NaOH at room temperature to convert to a sodium type. Result of evaluation of the resulting material is summarized in Table 3 and, although the moisture absorbing rate was quick because said particles were porous, the saturated moisture absorbing ratio was low and only nearly the same characteristics as other inorganic moisture absorbers were obtained. The reasons therefor are presumed to be that the amount of the hydrophilic carboxylic group was as low as 1.5 meq/g.

MERIT OF THE INVENTION

The noteworthy merit of the present invention is to offer an organic polymer having good moisture-absorbing and

TABLE 3

|  | Comparative Example 4 | Comparative Example 5 | Comparative Example 6 |
| --- | --- | --- | --- |
| Type of Moisture-Absorbing and Desorbing Material Used | Non-porous Moisture Absorber | Non-porous Moisture Absorber | Porous Moisture Absorber |
| Carboxyl Group Amount (meg/g) | 6.9 | 6.2 | 1.5 |
| Salt Type Carboxyl Croup | Na | Na | Na |
| Specific Surface Area ($m^2/g$) | 0.5 | <1 | 5.3 |
| Average Pore Size ($\mu m$) | * (<0.001) | 35 | 0.06 |
| Shape or Form | Filmy | Fiber | Particles |
| Cross-Linking Structure | Derived from Hydrazine Compound | Derived from Hydrazine Compound | Derived from Divinylbenzene |
| 10-min Moisture-Absorption (wt %) | 5 | 3 | 6 |
| 1-hr Moisture-Absorption (wt %) | 12 | 5 | 15 |
| Saturated Moisture-Absorption (wt %) | 63 | 41 | 17 |
| Moisture-Desorbing Ratio (wt %) | 17 | 12 |  |
| Primary Particle Size ($\mu m$) |  |  | 18 |
| Particle Size of Coagulates ($\mu m$) |  |  | 71 |

*: measurement impossible

Comparative Example 5.

Common acrylic fiber for clothing was subjected to a hydrazine treatment and a hydrolysis by the same manner as in Example 1 to give a fibrous moisture-absorbing material. Each of the characteristics is as summarized in Table 3. Like desorbing properties and being capable of expressing said moisture-absorbing and desorbing properties in a short period by utilizing an organic high-molecular substance containing polar group having a high affinity to water or to offer an organic polymer having good moisture-absorbing and desorbing rates which have not been available until now.

When the function of the porous moisture-absorbing and desorbing polymer of the present invention is actively utilized, it is now possible to apply said polymer to various fields including fiber, processed fiber, nonwoven fabric, film, binders, paints, adhesives, sensors, resins, electricity and electronics.

What is claimed is:

1. A method for the manufacture of a porous moisture-absorbing and desorbing polymer, characterized in that, a polymer solution prepared from an acrylonitrile polymer and a solvent therefor is coagulated in a solvent which is a non-solvent for said polymer to give a porous acrylonitrile polymer, then cross-links are introduced thereinto by the reaction with a hydrazine compound, and a hydrolysis of the residual nitrile group is conducted to introduce 2.0–12.0 meq/g of carboxyl groups of a salt type thereinto whereby the resulting polymer has macropores of not less than 1 $m^2/g$ of specific surface area and 0.005–1.0 $\mu$m of average pore size.

2. A method for the manufacture of a porous moisture-absorbing and desorbing polymer, characterized in that, a monomer mixture containing not less than 50% by weight of acrylonitrile is subjected to an aqueous precipitation polymerization to give a porous acrylonitrile polymer, then cross-links are introduced by the reaction with a hydrazine compound, and a hydrolysis of the residual nitrile group is conducted to introduce 2.0–12.0 meq/g of carboxyl groups of a salt type therein whereby the resulting polymer has macropores of not less than 1 $m^2/g$ of specific surface area and 0.005–1.0 $\mu$m of average pore size.

* * * * *